(12) United States Patent
Nakamura

(10) Patent No.: US 9,945,713 B2
(45) Date of Patent: Apr. 17, 2018

(54) LIQUID LEVEL DETECTOR AND FUEL PUMP MODULE INCLUDING LIQUID LEVEL DETECTOR

(71) Applicant: AISAN KOGYO KABUSHIKI KAISHA, Obu-shi (JP)

(72) Inventor: Takahiro Nakamura, Anjo (JP)

(73) Assignee: Aisan Kogyo Kabushiki Kaisha, Aichi (JP)

( * ) Notice: Subject to any disclaimer, the term of this patent is extended or adjusted under 35 U.S.C. 154(b) by 43 days.

(21) Appl. No.: 15/104,600

(22) PCT Filed: Sep. 1, 2014

(86) PCT No.: PCT/JP2014/072937
§ 371 (c)(1),
(2) Date: Jun. 15, 2016

(87) PCT Pub. No.: WO2015/093102
PCT Pub. Date: Jun. 25, 2015

(65) Prior Publication Data
US 2016/0313172 A1   Oct. 27, 2016

(30) Foreign Application Priority Data

Dec. 17, 2013  (JP) ................................. 2013-260314

(51) Int. Cl.
*G01F 23/38* (2006.01)
*G01F 23/36* (2006.01)
(Continued)

(52) U.S. Cl.
CPC .............. *G01F 23/38* (2013.01); *C08G 59/00* (2013.01); *C08G 75/14* (2013.01); *F02D 33/003* (2013.01);
(Continued)

(58) Field of Classification Search
CPC ....... C08G 59/00; C08G 75/14; F02D 33/003; F02M 37/10; F02M 37/106; G01F 23/38;
(Continued)

(56) References Cited

U.S. PATENT DOCUMENTS

| 2004/0182150 A1* | 9/2004 | Okada .................... G01F 23/36 73/313 |
| 2007/0090832 A1* | 4/2007 | Yasuda .................. G01F 23/38 324/207.25 |

(Continued)

FOREIGN PATENT DOCUMENTS

| JP | 2006-527374 A | 11/2006 |
| JP | 2008-014917 A | 1/2008 |

(Continued)

OTHER PUBLICATIONS

International Preliminary Examination Report for PCT/JP2014/072937 dated Jun. 23, 2016 (7 pages total including English translation).

(Continued)

*Primary Examiner* — Randy Gibson
*Assistant Examiner* — Gedeon M Kidanu
(74) *Attorney, Agent, or Firm* — Shumaker, Loop & Kendrick, LLP

(57) ABSTRACT

A liquid level detector may include a float, an arm member, and a magnetic sensor unit. The float may be attached to the arm member. The arm member may be configured to convert a movement of the float in a vertical direction to a rotational movement. The magnetic sensor unit may include a magnetic sensor and covers. The covers may cover the magnetic sensor. The covers may include a first cover, and a second cover. The first cover may be made of a first resin material. The first cover may cover a whole surface of the magnetic sensor. The second cover may be made of a second resin material different from the first resin material. The second cover may cover a whole surface of the first cover.

6 Claims, 4 Drawing Sheets

(51) Int. Cl.
*G01F 23/76* (2006.01)
*F02M 37/10* (2006.01)
*F02D 33/00* (2006.01)
*C08G 59/00* (2006.01)
*C08G 75/14* (2006.01)
*B60K 15/03* (2006.01)

(52) U.S. Cl.
CPC .......... *F02M 37/10* (2013.01); *F02M 37/106* (2013.01); *B60K 2015/03217* (2013.01); *G01F 23/36* (2013.01); *G01F 23/76* (2013.01)

(58) Field of Classification Search
CPC .......... G01F 23/32; G01F 23/30; G01F 23/36; G01F 23/76
See application file for complete search history.

(56) References Cited

U.S. PATENT DOCUMENTS

| | | | | |
|---|---|---|---|---|
| 2007/0272009 | A1* | 11/2007 | Heimann | G01F 23/36 73/322.5 |
| 2007/0290681 | A1* | 12/2007 | Yasuda | G01F 23/38 324/207.25 |
| 2008/0072668 | A1* | 3/2008 | Miyagawa | G01F 23/363 73/319 |
| 2008/0231267 | A1* | 9/2008 | Miyagawa | G01F 23/38 324/207.25 |
| 2012/0011931 | A1* | 1/2012 | Ichisawa | G01F 23/38 73/317 |
| 2015/0000398 | A1* | 1/2015 | Ogasawara | G01F 23/38 73/322.5 |

FOREIGN PATENT DOCUMENTS

| | | | | |
|---|---|---|---|---|
| JP | | 2010-149529 A | 7/2010 | |
| JP | | 2010-230537 A | 10/2010 | |
| JP | | 2011-141146 A | 7/2011 | |
| JP | | 2011-196947 A | 10/2011 | |
| WO | WO 2011083661 A1 * | | 7/2011 | G01F 23/38 |

OTHER PUBLICATIONS

International Search Report for PCT/JP2014/072937 (including English translation) dated Dec. 2, 2014 (3 pages).

* cited by examiner

LIQUID LEVEL DETECTOR AND FUEL PUMP MODULE INCLUDING LIQUID LEVEL DETECTOR

TECHNICAL FIELD

A technology disclosed herein relates to a liquid level detector configured to detect a liquid level of liquid stored in a container (e.g., a detector configured to detect a level of fuel that is stored in a fuel tank of an automobile or the like) and a fuel pump module including such a liquid level detector.

BACKGROUND ART

Japanese Patent Application Publication No. 2010-230537 A discloses a liquid level detector including a float arm including a float, a magnet configured to displace with a motion of the float arm, and a magnetic sensor configured to detect a change in magnetism of the magnet. The magnetic sensor is disposed in a fuel tank and immersed in fuel.

SUMMARY OF INVENTION

Technical Problem

In the liquid level detector disclosed in Japanese Patent Application Publication No. 2010-230537 A, the magnetic sensor is covered with a first cover made of resin. The first cover is covered with a second cover made of resin, excluding a portion of the first cover. That is, the first cover has the portion exposed to outside of the second cover. In the place where the portion of the first cover is exposed to outside of the second cover, the magnetic sensor is isolated from liquid solely by the first cover. In this configuration, the magnetic sensor makes contact with the liquid when the liquid permeates through the first cover. This may give rise to a situation where a liquid level cannot be properly detected using the magnetic sensor.

The present disclosure provides a technology for restraining a magnetic sensor from making contact with liquid.

Solution to Technical Problem

A liquid level detector disclosed herein comprises a float, an arm member, and a magnetic sensor unit. The float is attached to the arm member. The arm member is configured to convert a movement of the float in a vertical direction to a rotational movement. The magnetic sensor unit comprises a magnetic sensor, and a plurality of covers. The magnetic sensor is configured to output an analog signal corresponding to the rotational movement of the arm member. The plurality of covers covers the magnetic sensor. The plurality of covers comprises a first cover and a second cover. The first cover is made of a first resin material. The first cover covers a whole surface of the magnetic sensor. The second cover is made of a second resin material different from the first resin material. The second cover covers a whole surface of the first cover.

In the liquid level detector described above, the magnetic sensor is covered with the first cover. The first cover has its whole surface covered with the second cover made of a material different from that of which the first cover is made. This causes the magnetic sensor to be isolated from liquid by at least the two covers made of different materials (i.e., the first cover and the second cover). This configuration allows the liquid to be restrained by the first cover from making contact with the magnetic sensor even if the liquid permeates through the second cover. For this reason, as compared with a configuration in which a magnetic sensor is isolated from liquid solely by a single cover, the liquid may be restrained from permeating through the cover and making contact with the magnetic sensor.

A fuel pump module disclosed herein includes a fuel pump configured to pump fuel in a fuel tank, and the above-described liquid level detector. The magnetic sensor unit is attached to the fuel pump.

According to this configuration, the fuel may be restrain from making contact with the magnetic sensor even in a situation where the fuel pump module is immersed in the fuel.

DESCRIPTION OF EMBODIMENTS

First, features of an embodiment described below are enumerated. It should be noted that the features enumerated here are each independently effective.

In a liquid level detector, the first resin material may have a lower permeability to a first liquid than that of the second resin material. The second resin material may have a lower permeability to a second liquid than that of the first resin material. In this configuration, the first resin material hardly allows permeation of the first liquid as compared with the second resin material. Meanwhile, the second resin material hardly allows permeation of the second liquid as compared with the first resin material. This configuration causes the first liquid to be retrained by the first cover from making contact with the magnetic sensor. Meanwhile, the second liquid is restrained by the second cover from making contact with the magnetic sensor. As a result, this makes it possible to restrain the magnetic sensor from making contact with a liquid mixture of the first liquid and the second liquid in a state where the magnetic sensor unit is immersed in the liquid mixture.

In the liquid level detector, the magnetic sensor unit may include a lead terminal electrically connected to the magnetic sensor. The lead terminal may penetrate the plurality of the covers. The part of the lead terminal may be exposed to outside of the plurality of covers. This configuration makes it possible to supply power to the magnetic sensor and input and output signals to and from the magnetic sensor via the lead terminal from outside of the plurality of covers. For example, the outputting of a signal includes acquiring an analog signal from the magnetic sensor via the lead terminal from outside of the plurality of covers.

In the liquid level detector, at least one of the first cover and the second cover may be in liquid-tight contact with the lead terminal. This configuration makes it possible to restrain the liquid from entering through an interface between the plurality of covers and the lead terminal.

In the liquid level detector, the first resin material may be epoxy resin The second resin material may be polyphenylene sulfide resin. Epoxy resin hardly allows permeation of gasoline, and polyphenylene sulfide resin hardly allows permeation of alcohol. Further, epoxy resin has very high adhesive strength to metal. For this reason, in a case where the lead terminal is made of metal, epoxy resin can achieve a liquid-tight interface with the lead terminal. Therefore, even in a case where the magnetic sensor is used in a state where it is immersed in a fuel mixture of alcohol and gasoline, the magnetic sensor can be restrained from making contact with alcohol and gasoline.

First Embodiment

Figure 1:
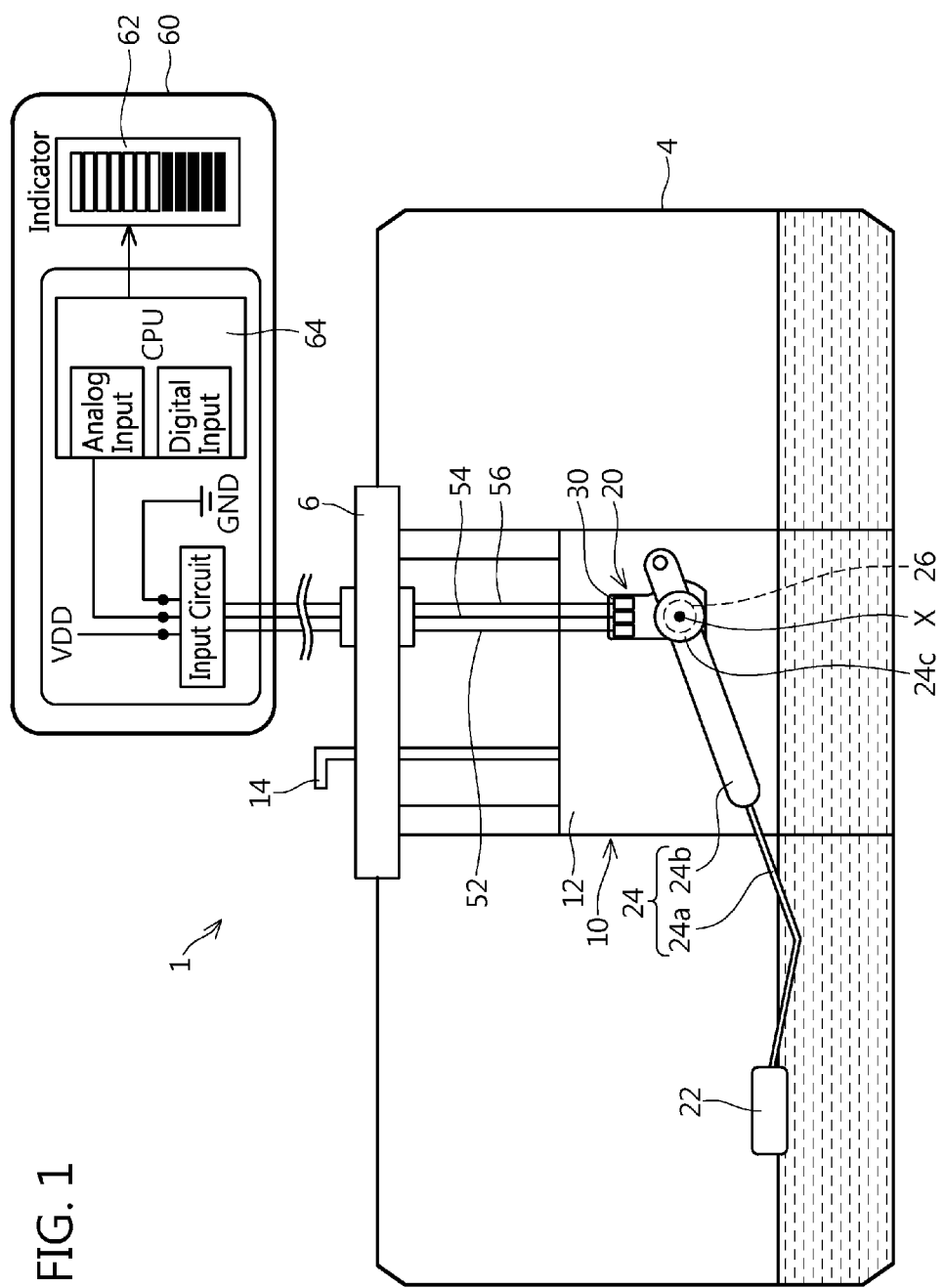
FIG. 1 shows a configuration of a fuel supply system.

As shown in FIG. 1, a fuel supply system 1 is a system for supplying an internal combustion engine (not illustrated) with fuel in a fuel tank 4 mounted in an automobile. In the present embodiment, the fuel contains gasoline and alcohol (e.g., ethanol). The fuel supply system 1 includes a fuel meter 60 and a fuel pump module 10. The fuel meter 60 is used in a display device (not illustrated) of the automobile. The fuel pump module 10 is disposed in the fuel tank 4. The fuel meter 60 and the fuel pump module 10 are electrically connected to each other via a plurality of lines 52, 54, and 56. It should be noted that gasoline corresponds to an example of the "first liquid" and alcohol corresponds to an example of the "second liquid".

The fuel pump module 10 includes a fuel pump unit 12 and a fuel level detector 20. The fuel pump unit 12 is accommodated in the fuel tank 4. The fuel pump unit 12 is attached to a set plate 6 that closes an opening of the fuel tank 4. The fuel in the fuel tank 4 is sucked into the fuel pump unit 12, pressurized in the fuel pump unit 12, and discharged out of the fuel pump unit 12. The fuel discharged from the fuel pump unit 12 is supplied to the internal combustion engine (not illustrated) through a discharge port 14. It should be noted that the fuel level detector 20 corresponds to an example of the "liquid level detector".

The fuel level detector 20 includes a float 22, an arm member 24 to which the float 22 is fixed, and a magnetic sensor unit 30 configured to detect an angle of rotation of the arm member 24. The float 22 floats on the fuel in the fuel tank 4 and moves in a vertical direction according to a liquid level of the fuel. The float 22 is rotatably attached to a distal end of the arm member 24. A proximal end of the arm member 24 is rotatably supported with respect to the magnetic sensor unit 30. As a result, when the float moves in the vertical direction according to the liquid level of the fuel in the fuel tank 4, thereby the arm member 24 swings and rotates with respect to the fuel pump unit 12.

The arm member 24 includes a float attachment portion 24a and a base portion 24b. The float attachment portion 24a is made of a metal having resistance to the fuel, such as stainless steel. The float attachment portion 24a is made by bending a cylindrical rod member at an intermediate position of the cylindrical rod member. The float attachment portion 24a has a distal end to which the float 22 is attached. The float attachment portion 24a has a proximal end to which the base portion 24b is fixed.

The base portion 24b is made of a resin having resistance to the fuel (such as polyphenylene sulfide resin (hereinafter referred to as "PPS")). The base portion 24b is made of a material different from a material of which the float attachment portion 24a is made. Specifically, the base portion 24b is made of a material lighter than a material of which the float attachment portion 24a is made. That is, the base portion 24b is made of a material lower in density (i.e., mass per unit volume) than a material of which the float attachment portion 24a is made. Further, the float attachment portion 24a is made of a material higher in rigidity than a material of which the base portion 24b is made.

The base portion 24b is formed in the shape of a flat plate. The base portion 24b is rotatably supported by the magnetic sensor unit 30 at a supporting point portion 24c that is closer to a distal end of the base portion 24b than a proximal end of the base portion 24b.

Figure 2:
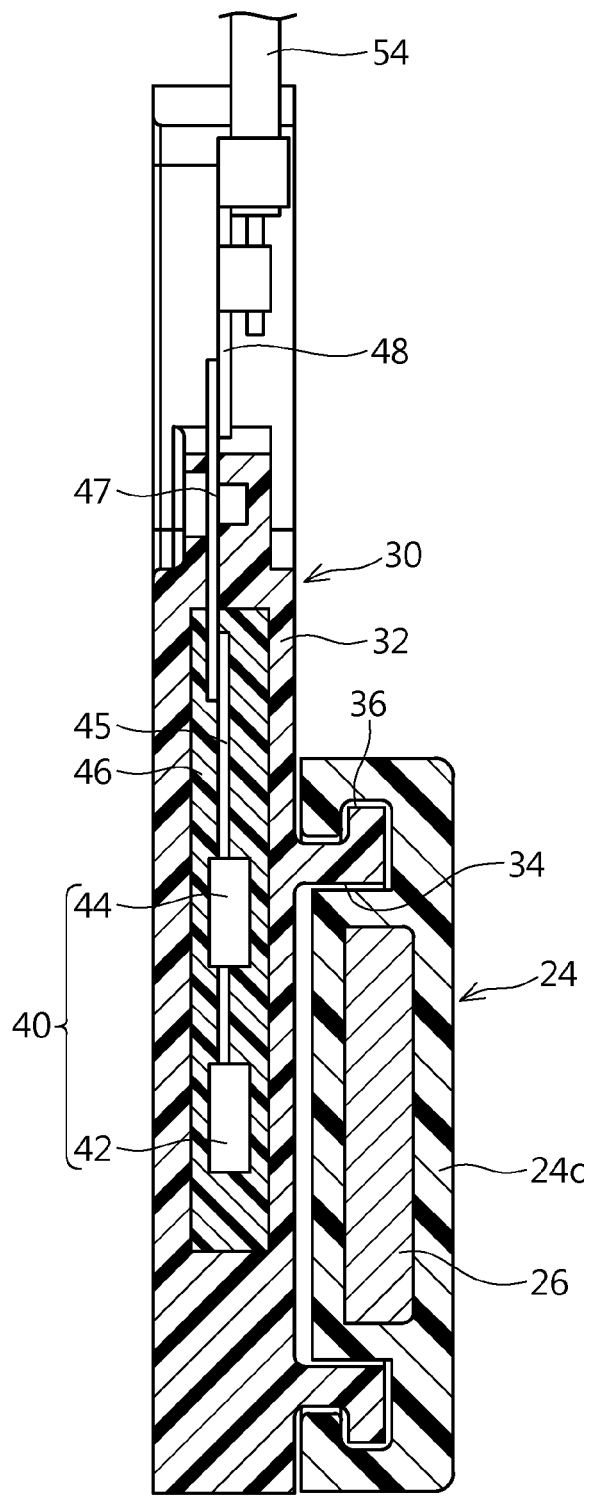
FIG. 2 is a longitudinal sectional view of a magnetic sensor unit.

The supporting point portion 24c has a disc shape. A center of rotation X of the arm member 24 coincides with a center of the supporting point portion 24c. As shown in FIGS. 1 and 2, the supporting point portion 24c accommodates a magnet 26. The magnet 26 is disposed in the base portion 24b, for example, by insert molding of the base portion 24b. The magnet 26 is a permanent magnet. The magnet 26 has a disc shape. A center of the magnet 26 coincides with the center of the supporting point portion 24c (i.e., the center of rotation X). The magnet 26 has its north pole in one semicircular portion thereof and has its south pole in the other semicircular portion thereof. The magnet 26 rotates as the arm member 24 swings and rotates. As a result, a direction of a magnetic field that is generated by the magnet 26 varies as the arm member 24 swings and rotates.

The magnetic sensor unit 30 rotatably supports the arm member 24. FIG. 2 is a sectional view of the magnetic sensor unit 30 and the supporting point portion 24c as taken along a vertical line passing though the center of rotation X in FIG. 1. As shown in FIG. 2, the magnetic sensor unit 30 includes a cover 32, a cover 46, a magnetic sensor 40, and lead wires 45 and 47.

The cover 32 is made of a material that is low in alcohol permeability. The material is PPS in the present embodiment. PPS is lower in alcohol permeability than epoxy resin, which will be described below. Note here that the statement that "PPS is low in alcohol permeability" means that alcohol hardly permeates through PPS. The cover 32 includes a receiving portion 34 configured to receive a portion of the supporting point portion 24c of the arm member 24 in which the magnet 26 is accommodated. The receiving portion 34 has a cylindrical shape. The receiving portion 34 has a hollow portion in which the magnet 26 is disposed. The supporting point portion 24c of the arm member 24 slidably engages with a flange 36 of the receiving portion 34 in a state where the magnet 26 is disposed in the receiving portion 34. As a result, the cover 32 rotatably supports the arm member 24 In the present embodiment, the cover 32 is made of PPS. However, without being limited to this, the cover 32 may be made, for example, of polytetrafluoroethylene (PTFE). It should be noted that the cover 46 corresponds to an example of the "first cover" and the cover 32 corresponds to an example of the "second cover".

The cover 46 is made of a material that is low in gasoline permeability. The material is epoxy resin in the present embodiment. That is, the cover 46 is made of a material different from that of which the cover 32 is made. Epoxy resin is lower in gasoline permeability than PPS. The cover 46 is covered with the cover 32 by performing so-called insert molding, i.e., performing molding of the cover 32 with the cover 46 placed in a mold of the cover 32 upon molding of the cover 32. In the present embodiment, the cover 46 is made of epoxy resin. However, without being limited to this, the cover 46 may be made, for example, of polybutylene terephthalate (PBT) or polyacetal (POM) resin.

Figure 3:
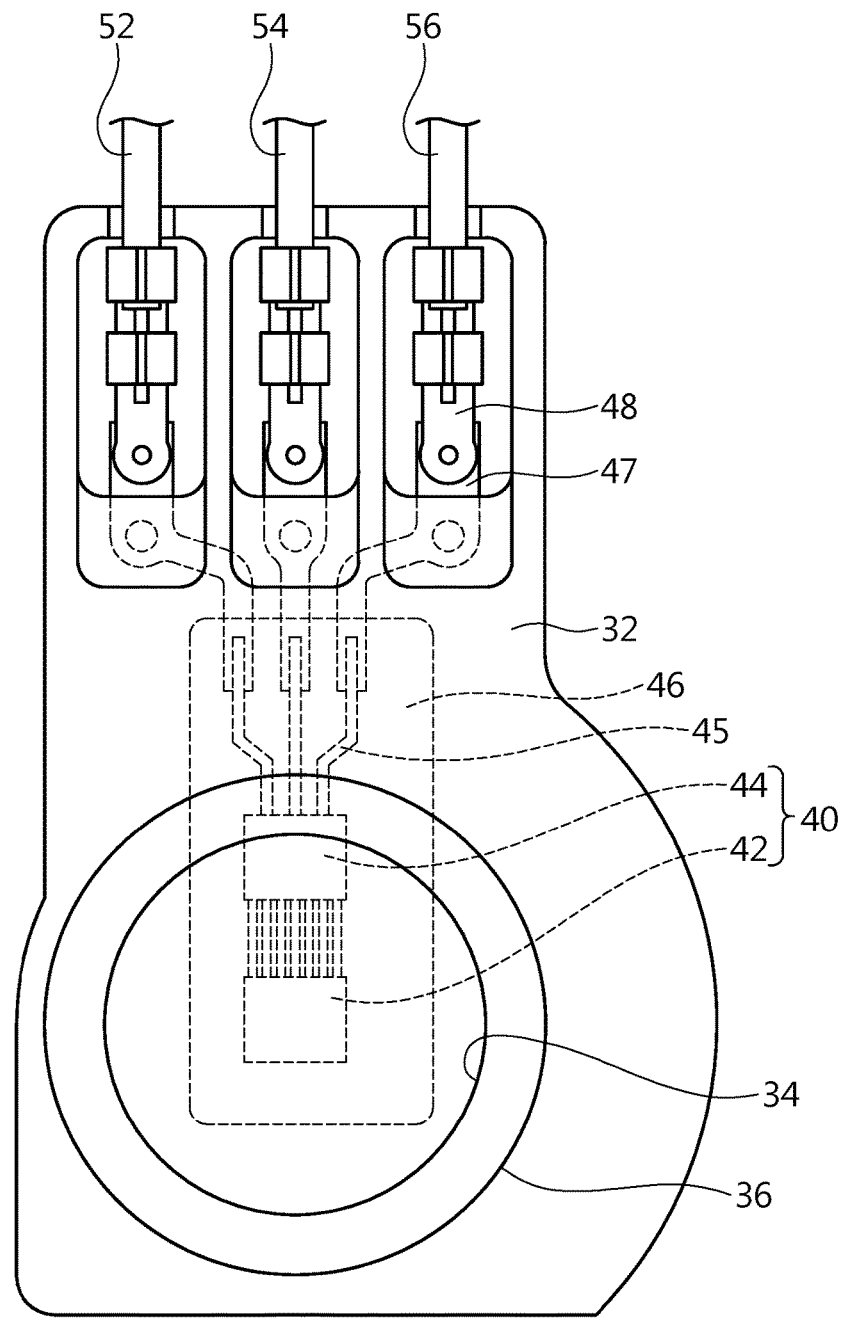
FIG. 3 is a plan view of the magnetic sensor unit.
Figure 4:
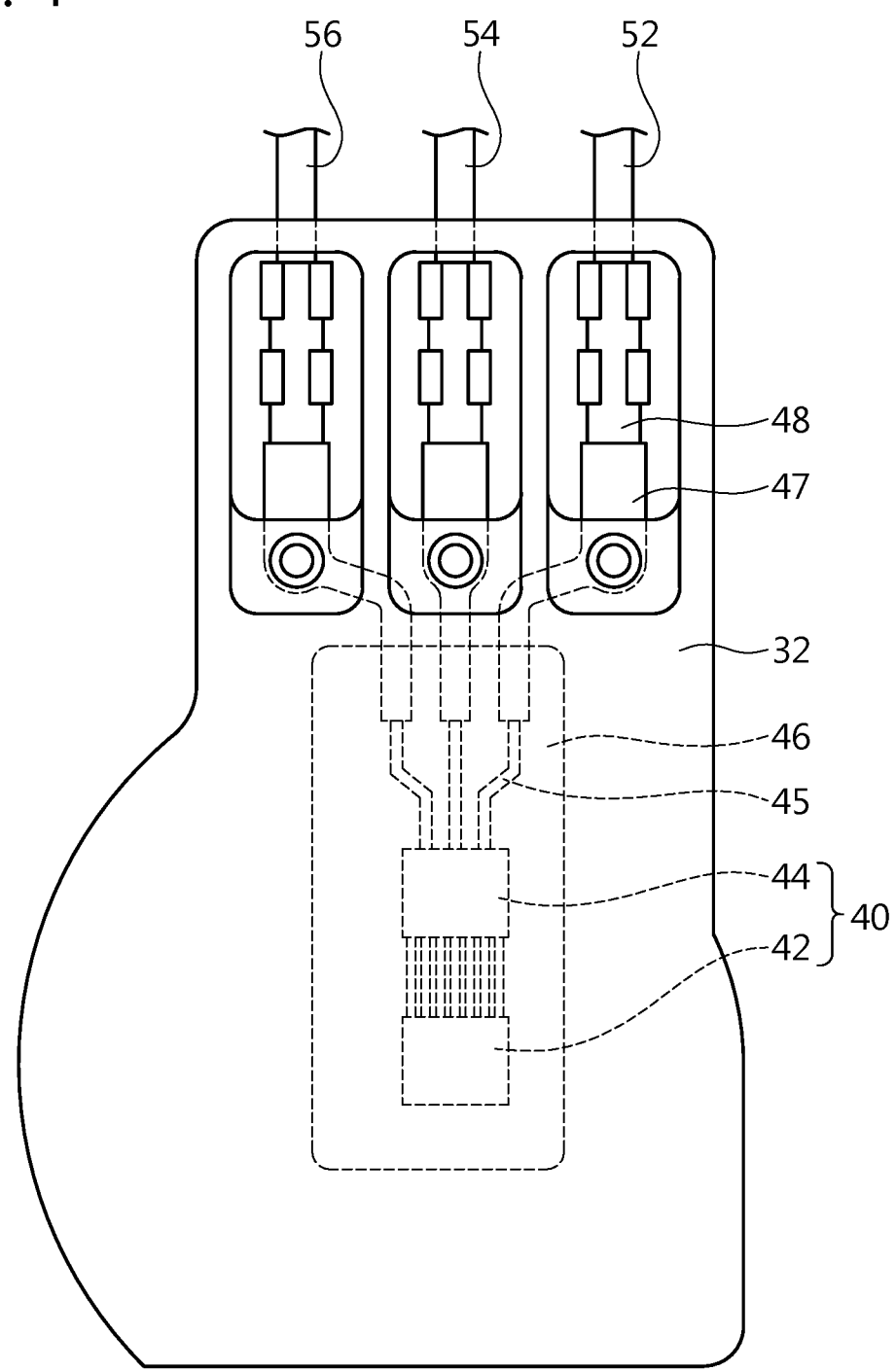
FIG. 4 is a bottom view of the magnetic sensor unit.

FIG. 3 is a plan view of the magnetic sensor unit 30, and FIG. 4 is a bottom view of the magnetic sensor unit 30. In FIGS. 3 and 4, the magnetic sensor 40 and the lead wires 45 and 47, which are covered with the covers 32 and 46, are indicated by broken lines. As shown in FIGS. 2 to 4, the cover 46 has a substantially rectangular parallelepiped shape. The cover 46 has its whole surface covered with the cover 32. In other words, no portion of the cover 46 is exposed to outside of the cover 32.

The magnetic sensor 40 detects a rotational movement of the arm member 24. On the basis of a result of the detection, the magnetic sensor 40 outputs, to the fuel meter 60, an analog signal corresponding to a level of the fuel that is stored in the fuel tank 4 (see FIG. 1). The magnetic sensor 40 is a magnetic sensor configured to detect a rotation angle of the arm member 24. For example, a known sensor including a Hall IC may be utilized as the magnetic sensor 40. Specifically, the magnetic sensor 40 includes a detection circuit 42 and an input-output circuit 44 connected to the detection circuit 42. The detection circuit 42 includes a Hall element configured to detect a direction of a magnetic field of the magnet 26. The input-output circuit 44 includes a capacitor. As shown in FIGS. 2 to 4, the magnetic sensor 40 has its whole surface covered with the cover 46. In other words, no portion of the magnetic sensor 40 is exposed to outside of the cover 46. The detection circuit 42 is disposed on an end side of the cover 46 (on a lower side of FIGS. 2 to 4). Specifically, the detection circuit 42 is disposed at an end opposite to an end at which the lead wires 47, which will be described below, penetrate the cover 46. The input-output circuit 44 is disposed in substantially a center of the cover 46 (i.e., above the detection circuit 42 in FIGS. 2 to 4) (as will be described below).

Three lead wires 45 extend from the input-output circuit 44 in a direction opposite to the detection circuit 42. The three lead wires 45 have their upper ends connected to lower ends of three lead wires 47, respectively. The three lead wires 47 have their upper ends connected to terminals 48 of the power supply line 52, the output line 54, and the ground line 56, respectively. The power supply line 52, the output line 54, and the ground line 56 penetrate the set plate 6 and are connected to the fuel meter 60. The lead wires 45 and 47 and the terminals 48 are made of a highly conductive material (which is copper in the present embodiment). It should be noted that each of the lead wires 47 corresponds to an example of the "lead terminal".

The magnetic sensor 40 is covered with the cover 46 by performing so-called insert molding, i.e., performing molding of the cover 46 with the magnetic sensor 40 placed in a mold of the cover 46 upon performing molding of the cover 46. The lead wires 45 are covered with the cover 46. Further, the ends of the lead wires 47 on the side of the lead wires 45 are covered with the cover 46. The lead wires 47 extend from the connecting locations between the lead wires 47 and the lead wires 45 in a direction away from the magnetic sensor 40, penetrate the cover 46 and the cover 32, and are exposed to outside of the cover 32.

In this configuration, the cover 46 is molded in a state where a portion of each of the lead wires 47 is in contact with the resin material (i.e., epoxy resin) of which the cover 46 is made.

As shown in FIGS. 2 to 4, the magnetic sensor 40 is disposed from the center to the lower part of the cover 46. That is, the magnetic sensor 40 is disposed at a position in the cover 46 that is away from an upper portion of each of the lead wires 47 (i.e., a portion of each of the lead wires 47 that is exposed to outside of the cover 32). Furthermore, the detection circuit 42 is disposed on an opposite side from the lead wires 47 with respect to the input-output circuit 44. For this reason, a distance between the detection circuit 42 and the upper portion of each of the lead wires 47 is longer than s distance between the input-output circuit 44 and the upper portion of each of the lead wires 47.

The fuel meter 60 includes a CPU 64 and an indicator 62. The CPU 64 supplies power to the fuel level detector 20, in detail the magnetic sensor 40, via the power supply line 52. The CPU 64 receives an analog signal from the magnetic sensor 40 via the output line 54. The CPU 64 specifies the level of the fuel that is stored in the fuel tank 4 in accordance with the analog signal received from the magnetic sensor 40. The CPU 64 indicates the specified fuel level on the indicator 62. The CPU 64 and the display 62 may be configured in a manner similar to those of a conventionally known fuel meter. In the CPU 64, the ground line 56 is grounded.

(Liquid Level Detection Method)

The following will describe a liquid level detecting method. The CPU 64 supplies power to the magnetic sensor 40 while the automobile is in operation (i.e., while the engine is being driven). The magnetic sensor 40 outputs an analog signal corresponding to the direction of a magnetic field of the magnet 26. A change in height of the liquid level of the fuel in the fuel tank 4 causes the float 22 to move in the vertical direction, and the arm member 24 rotates as the float 22 moves in the vertical direction. The magnet 26 rotates as the arm member 24 rotates. As a result, the direction of the magnetic field of the magnet 26 varies depending on the rotation of the arm member 24, i.e., the height of the liquid level of the fuel in the fuel tank 4. For this reason, the analog signal from the magnetic sensor 40 correlates with the height of the liquid level of the fuel in the fuel tank 4.

Upon receiving the analog signal from the magnetic sensor 40, the CPU 64 specifies the level of the fuel that is stored in the fuel tank 4 and indicates the specified fuel level on the indicator 62. Specifically, the CPU 64 specifies the fuel level using a database or function stored in the CPU 64 that shows a relationship between analog signals from the magnetic sensor 40 and fuel levels. The database or function is specified in advance by executing experiments or simulations and stored in the CPU 64.

In the fuel level detector 20, the magnetic sensor 40 has its whole surface covered with the cover 46 made of epoxy resin. The cover 46 has its whole surface covered with the cover 32 made of PPS. For this reason, even if a rise in the liquid level of the fuel in the fuel tank 4 causes the magnetic sensor unit 30 to be immersed in the fuel, the magnetic sensor 40 is isolated from the fuel by the two covers made of different materials (i.e., the cover 46 and the cover 32). As compared with a configuration in which the magnetic sensor 40 is isolated from the fuel solely by a cover made of a single type of material, this configuration makes it possible to restrain the magnetic sensor 40 from making contact with the fuel. Accordingly, a detection error or deterioration of the magnetic sensor 40 due to the contact of the magnetic sensor 40 with the fuel can be prevented. As a result, this makes it possible to properly detect a fuel level using the magnetic sensor 40.

Further, in the fuel level detector 20, PPS, of which the cover 32 is made, is low in alcohol permeability. On the other hand, epoxy resin, of which the cover 46 is made, is low in gasoline permeability. For this reason, when the magnetic sensor unit 30 is immersed in fuel containing alcohol and gasoline, gasoline hardly permeates through the cover 46, although gasoline permeates through the cover 32. Similarly, alcohol hardly permeates through the cover 32. This makes it possible to restrain the magnetic sensor 40 from making contact with alcohol or gasoline. Therefore, even in a case where the magnetic sensor unit 30 is used in a state where it is immersed in fuel obtained by mixing alcohol into gasoline, the magnetic sensor 40 can appropriately be restrained from making contact with the fuel. As a result, the fuel level detector 20 can appropriately be used even in the ease of fuel obtained by mixing alcohol into gasoline.

Further, in the fuel level detector 20, the upper portion of each of the lead wires 47 to which the magnetic sensor 40 is electrically connected penetrate the cover 46 and the cover 32 and is exposed to outside of the cover 32 (i.e., outside of the magnetic sensor unit 30). This makes it possible to supply power from outside of the magnetic sensor unit 30 to the magnetic sensor 40 via the lead wires 47. This also makes it possible to input an analog signal from the magnetic sensor 40 to the CPU 64 via the lead wires 47, 48, and the output line 54.

Further, in the fuel level detector 20, the cover 46 is molded in a state where portion of each of the lead wires 47 is in contact with the cover 46. The cover 46 is made of epoxy resin, and the lead wires 47 are made of copper. Epoxy resin has high adhesion to metal. For this reason, the cover 46 makes liquid-tight contact with the lead wires 47. Therefore, even if the upper portion of each of the lead wires 47 is exposed to outside of the magnetic sensor unit 30, the fuel can be restrained from entering the magnetic sensor unit 30 through an interface between the lead wires 47 and the cover 46.

Further, the magnetic sensor 40 is disposed at a position in the cover 46 that is away from the position at which the lead wires 47 penetrate the cover 32. For this reason, even if the fuel enters through the interface between the lead wires 47 and the cover 32, the fuel can be restrained from reaching the magnetic sensor 40 along the lead wires 45 and 47. Further, the Hall element is less resistant to the fuel than the capacitor. For this reason, by disposing the detection circuit 42, which includes the Hall element, at a position that is farther away than the input-output circuit 44, which includes the capacitor, from the position at which the lead wires 47 penetrate the cover 32, the Hall element can be further restrained from making contact with the fuel.

The technical features described in the description or the drawings may technically be useful alone or in various combinations, and are not limited to the combinations as originally claimed.

For example, the cover 32 may be made of a material (e.g., epoxy resin) that is low in gasoline permeability, and the cover 46 may be made of a material (e.g., PPS) that is low in alcohol permeability. In this case, it is preferable that at least either of the materials of which the covers 32 and 46 are made has high adhesion to the lead wires 47.

Further, the magnetic sensor 40 may be covered with three or more covers respectively made of different materials. In this case, it is preferable that each of the materials be a material that hardly allows permeation of any of the plural types of liquid contained in the fuel. Moreover, it is preferable that the lead wires 47 penetrate all of the covers that cover the magnetic sensor 40 and that a portion of each of the lead wires 47 be exposed to outside of the outermost cover. In this case, too, it is preferable that at least one of the materials has high adhesion to the lead wires 47.

Further, the covers 32 and 46 are not limited to being made of resin materials but may be made of metal materials, provided such metal materials satisfy the aforementioned conditions.

Further, for example, the "liquid level detector" herein may be a device configured to detect a level of liquid in a container, such as a level of water stored in a water storage tank, as well as the fuel level detector 20 configured to detect the level of the fuel in the fuel tank 4.

Further, the art described in the description or the drawings may concurrently achieve a plurality of aims, and technical significance thereof resides in achieving any one of such aims.

The invention claimed is:

1. A liquid level detector comprising:
a float;
an arm member to which the float is attached, the arm member configured to convert movement of the float in a vertical direction to rotational movement; and
a magnetic sensor unit configured to detect the rotational movement of the arm member, wherein
the magnetic sensor unit comprises:
a magnetic sensor configured to output an analog signal in response to the rotational movement of the arm member; and
a plurality of covers covering the magnetic sensor,
the plurality of covers comprise:
a first cover made of a first resin material, and covering a whole surface of the magnetic sensor; and
a second cover made of a second resin material different from the first resin material, and covering a whole surface of the first cover,
the first resin material has a lower permeability than that of the second resin material to one of gasoline or alcohol, and
the second resin material has a lower permeability than that of the first resin material to another of gasoline or alcohol.

2. The liquid level detector according to claim 1, wherein the first resin material has a lower permeability to the gasoline than the second resin material, and
the second resin material has a lower permeability to the alcohol than the first resin material.

3. The liquid level detector according to claim 1, wherein the first resin material is epoxy resin, and
the second resin material is polyphenylene sulfide resin.

4. A fuel pump module comprising:
a fuel pump configured to pump fuel in a fuel tank; and
the liquid level detector according to claim 1,
wherein the magnetic sensor unit is attached to the fuel pump.

5. The liquid level detector according to claim 1, wherein the magnetic sensor unit comprises a lead terminal electrically connected to the magnetic sensor,
the lead terminal penetrates the plurality of covers, and
a part of the lead terminal is exposed to outside of the plurality of covers.

6. The liquid level detector according to claim 5, wherein at least one of the first cover and the second cover is in liquid-tight contact with the lead terminal.

* * * * *